United States Patent [19]

Diethelm

[11] Patent Number: 4,798,848
[45] Date of Patent: Jan. 17, 1989

[54] HOT-FOAMABLE, THERMOSETTING EPOXY RESIN MIXTURE

[75] Inventor: Hermann Diethelm, Giffers, Switzerland

[73] Assignee: Ciba-Geigy Corporation, Ardsley, N.Y.

[21] Appl. No.: 190,326

[22] Filed: May 5, 1988

[30] Foreign Application Priority Data

May 13, 1987 [CA] Canada ................................ 1836/87

[51] Int. Cl.$^4$ ................................................ C08J 9/10
[52] U.S. Cl. .......................................... 521/89; 521/95; 521/121; 521/135
[58] Field of Search ................... 521/135, 89, 121, 95

[56] References Cited

U.S. PATENT DOCUMENTS

| | | | |
|---|---|---|---|
| 3,615,975 | 10/1971 | Gillern et al. | 521/135 |
| 3,629,163 | 12/1971 | Nolken | 521/135 |
| 3,649,572 | 3/1972 | Hairston et al. | 521/135 |
| 3,825,506 | 7/1974 | Carter | 521/135 |
| 3,941,725 | 9/1974 | Schmitter et al. | 260/2.5 |
| 4,157,428 | 6/1979 | Hammer | 521/135 |

FOREIGN PATENT DOCUMENTS 1244112 8/1971 United Kingdom .

*Primary Examiner*—Morton Foelak
*Attorney, Agent, or Firm*—Harry Falber

[57] ABSTRACT

Cured foams with a high degree of closed cellular structure, good stability under prolonged heat exposure and good compressive strength can be produced from a hot-foamable, thermosetting epoxy resin mixture containing (a) an epoxy resin or a mixture of epoxy resins with an average epoxide content of 4.4 to 5.0 equivalents/kg and an average epoxide functionality of more than 2.0, (b) a novolak with a hydroxyl equivalent weight of 90 to 120, 0.8 to 0.95 hydroxyl equivalents of component (b) being present in the epoxy resin mixture per 1 epoxide equivalent of component (a), (c) 1.0 to 1% by weight, based on the amount of components (a) and (b), of a curing accelerator, (d) 0.5 to 10% by weight, based on the amount of components (a) and (b), of a blowing agent which splits off nitrogen above 100° C. with decomposition, (e) 0.3 to 1% by weight, based on the total amount of the epoxy resin mixture, of an emulsifier, and if appropriate (f) foam modifiers.

11 Claims, No Drawings

HOT-FOAMABLE, THERMOSETTING EPOXY RESIN MIXTURE

The present invention relates to a hot-foamable, thermosetting epoxy resin mixture containing a novolak as the curing agent and, as the blowing agent, a compound which splits off nitrogen above 100° C. with decomposition, the use of the epoxy resin mixture for the production of foams and processes for the production of foams.

Foams based on epoxy resins are known and are generally distinguished by good mechanical strength and a good dimensional stability. For example, according to DE-OS No. 1,770,659, foams are produced by curing epoxy resins with cycloaliphatic polyamines at room temperature in the presence of polyhydric phenols as accelerators and of a blowing agent. The foams produced in this manner have a low compressive strength.

Foams with low compressive strength are likewise obtained by the process disclosed in DE-OS No. 2,443,430, in which a certain epoxy resin foam mixture is cured at room temperature or somewhat elevated temperature using a Lewis acid or an addition or complex compound of a Lewis acid.

It has now been found that hardened foams which in particular have better compressive strength and compression values, especially at elevated temperature, are obtained by hot-foaming, that is to say at temperatures above 100° C., an epoxy resin mixture containing novolak as the curing agent in a certain equivalent ratio relative to the epoxide group and a blowing agent which splits off nitrogen above 100° C.

The present invention thus relates to a hot-foamable, thermosetting epoxy resin mixture containing (a) an epoxy resin or a mixture of epoxy resins with an average epoxide content of 4.4 to 5.0 equivalents/kg and an average epoxide functionality of more than 2.0, (b) a novolak with a hydroxyl equivalent weight of 90 to 120, 0.8 to 0.95 hydroxyl equivalents of component (b) being present in the epoxy resin mixture per 1 epoxide equivalent of component (a), (c) 0.1 to 1% by weight, based on the amount of components (a) and (b), of a curing accelerator, (d) 0.5 to 10% by weight, based on the amount of components (a) and (b), of a blowing agent which splits off nitrogen above 100° C. with decomposition, (e) 0.3 to 1% by weight, based on the total amount of the epoxy resin mixture, of an emulsifier, and if appropriate (f) foam modifiers.

The hot-foamable epoxy resin mixture according to the invention preferably contains an epoxy resin or an epoxy resin mixture (a) with an average epoxide content of 4.6 to 5.0 equivalents/kg, a novolak (b) with a hydroxyl equivalent weight of 115 to 120 and a curing accelerator (c) in amounts of 0.3 to 1% by weight, based on the amount of components (a) and (b).

The epoxy resins or mixtures of epoxy resins contained as component (a) in the epoxy resin mixture according to the invention are known and are in some cases commercially available. Examples of such resins or resin mixtures which may be mentioned are: polyglycidyl esters of polycarboxylic acids, such as trimellitic acid, trimesic acid or pyromellitic acid, or of mixtures of polycarboxylic acids with dicarboxylic acids, such as phthalic acid or terephthalic acid; poly(N-glycidyl) compounds of diamines, such as m-xylylenediamine, bis-(4-aminophenyl)-methane or bis-(3-methyl-4-aminophenyl)-methane or of mixtures of diamines with monoamines, such as aniline; glycidyl ethers of polynuclear phenols, such as novolaks, which as is known are derived from aldehydes, such as formaldehyde, acetaldehyde, chloral or furfurylaldehyde, and phenols, such as phenol or phenol which is substituted on the ring by chlorine atoms or alkyl groups with up to 9 C atoms, such as 4-chlorophenol, 2-methylphenol or 4-tert-butylphenol, and glycidyl ethers of mixtures of polynuclear phenols and mono- or dinuclear phenols, such as resorcinol, hydroquinone, bis-(4-hydroxyphenyl)-methane, 4,4'-dihydroxydiphenyl, bis-(4-hydroxyphenyl)sulfone, 1,1,2,2-tetrakis-(4-hydroxyphenyl)-ethane, 2,2-bis-(4-hydroxyphenyl)-propane or 2,2-bis-(3,5-dibromo-4-hydroxyphenyl)-propane.

The mixture according to the invention can furthermore contain, as component (a), triglycidyl isocyanurate or epoxy resins in which the glycidyl groups are bonded to different hetero atoms, for example the N,N,O-triglycidyl derivative of 4-aminophenol.

The mixture according to the invention preferably contains, as component (a), one or more aromatic glycidyl ethers, in particular a cresol novolak glycidyl ether or a mixture of a cresol novolak glycidyl ether and a bisphenol A diglycidyl ether.

The novolaks contained as component (b) in the mixture according to the invention are likewise known compounds, some of which are commercially available, and are condensation products prepared from a phenol, for example phenol itself or alkyl-, alkoxy- or halogen-substituted phenol, and an aldehyde, for example formaldehyde, acetaldehyde, chloral or furfurylaldehyde. Such novolaks correspond to the general formula I

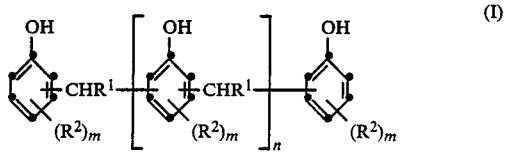

in which $R^1$ is a hydrogen atom, alkyl, aryl or a heterocyclic radical, $R^2$ is a halogen atom, alkyl or alkoxy, m is zero or a number from 1 to 3 and n is a number such that the novolak has a hydroxyl equivalent weight of 90 to 120, preferably 115 to 120.

Preferred novolaks are those of the formula I in which $R^1$ is a hydrogen atom, $R^2$ is alkyl with 1 to 4 C atoms and m is zero or the number 1. The mixtures according to the invention contain in particular, as component (b), a cresol novolak.

Curing accelerators (c) which can be used for the mixture according to the invention are the customary accelerators which can be used for curing an epoxy resin with a novolak, for example dicyandiamide, tertiary amines, such as tri-n-butylamine, tri-isobutylamine, benzyldimethylamine, tri-n-propylamine, tri-(hexyl)-amine or 2,4,6-tris-(dimethylaminomethyl)phenol, quaternary ammonium compounds, such as tetramethylammonium chloride, benzyltrimethylammonium hydroxide or benzyltrimethylammonium chloride, m-phenylenediamine, hexamethylenetetramine, imidazole or imidazole derivatives, for example 2-methylimidazole, 2-ethylimidazole, 2-ethyl-4-methylimidazole, 2-phenylimidazole or benzimidazole. The mixture according to the invention preferably contains an imidazole or an imidazole derivative, in particular 2-ethylimidazole, as the curing accelerator.

Blowing agents (d) which can be used for the mixture according to the invention are substances which split off nitrogen with decomposition, when the mixture is heated above 100° C., for example azo compounds, such as azoisobutyronitrile, or hydrazides, such as p-toluenesulfohydrazide (Genitron PTS$^R$). The mixtures according to the invention preferably contain p-toluenesulfohydrazide as the blowing agent.

The emulsifiers (e) contained in the mixture according to the invention are surface-active agents which act as pore regulators. They have the function of distributing the nitrogen formed from the blowing agent in regular bubbles throughout the entire foam, so that a foam with a substantially closed cellular structure is obtained. Substances which are particularly suitable for regulating the pore structure are non-ionic substances, for example hydroxyl-containing esters of fatty acids, such as lauric, palmitic, stearic or oleic acid, with polyhydric alcohols, such as sorbitol, and addition products thereof with polyoxyethylene onto the free hydroxyl groups ("Tweens"), for example polyoxyethylene sorbitan monolaurate or monostearate, and furthermore polyoxyglycols ("Pluronics"). Silicone oils, such as are commercially available, for example, under the tradename Rhodorsil ® from Rhôon-Poulenc, are known to be good pore regulators. The mixture according to the invention contains in particular as the emulsifier a polyether-polymethylsiloxane copolymer (Tegopren ® 5851 from Goldschmidt).

If appropriate, the mixture according to the invention can also contain customary foam modifiers, that is to say substances which can reduce the viscosity of the mixture according to the invention during processing, can improve the flow behavior of the foam or can be used as solvents for additives. These foam modifiers can be reactive, that is to say they can react with a component of the foam, or non-reactive. To improve the flow behavior of the foam, nonylphenol, for example, can be added to the mixture according to the invention as a reactive modifier and ethylhexyl phthalate, for example, can be added as a non-reactive modifier. They are advantageously used in amounts of 0.5 to 10% by weight, based on the amount of components (a) and (b).

Dyes, fillers, plasticizers or flameproofing agents, for example $Al_2O_3.3H_2O$, polyethylene, polypropylene or polyvinyl chloride, can furthermore be added to the mixture according to the invention.

The mixture according to the invention can be processed to foams manually or by means of a suitable machine, by foaming and curing the mixture in the temperature range from 120° to 180° C. The mixture according to the invention is advantageously suitable for mechanical production of a foam, for example by means of RIM machine (reactive injection moulding machine), since the viscosity of the mixture according to the invention does not change greatly during storage at elevated temperature and no severe evolution of heat occurs during curing of the foam in the closed mould, so that foam formation is not interfered with and a foam with a high degree of closed cellular structure is obtained. Cycle times of 10 to 20 minutes can be achieved in mechanical processing of the mixture according to the invention to give cured foams.

The present invention thus also relates to the use of the mixture according to the invention for mechanical production of a foam and a process for the production of crosslinked, insoluble and non-fusible epoxy resin foams by foaming and curing the mixture according to the invention in the temperature range from 120° to 180° C., preferably from 130° to 160° C.

The foams produced from the mixture according to the invention are distinguished by a homogeneous pore structure and a high degree of closed cellular structure. The foams also have a good stability to prolonged heat exposure and a good compressive strength, also at elevated temperature. The foams obtained from the mixture according to the invention are therefore particularly suitable as insulating materials against heat loss and against pressure and impact.

In the following examples, foams are produced using a casting mould. This mould has internal dimensions of 250×250×30 mm and consists of two outer metal plates (20 mm) which can be heated electrically and are separated 30 mm from one another by an unheated spacer frame. The spacer frame can be opened on one side so that the activated foam mixture can be poured in. The outer plates which can be heated and the metal spacer frame are held together by four screw clamps during curing of the foamed sheet. The sheets are cast upright, and for this the top screw clamp is removed and ¼ of the spacer frame is removed. After the activated foam mixture has been poured in, the section of the spacer frame which has been removed is inserted and the screw clamp is closed. The still hot plates and the hot spacer frame are coated with OP wax or a silicone-containing release agent for better removal from the mould.

EXAMPLE 1

A foam is produced using the following compounds:
bisphenol A diglycidyl ether (liquid), epoxide equivalent weight 185): 276.8 g (1.5 equivalents)
cresol novolak glycidyl ether (solid, epoxide equivalent weight 230): 276.8 g (1.2 equivalents)
cresol novolak (solid, hydroxyl equivalent weight 115): 287.2 g (2.5 equivalents)
polyether-polymethylsiloxane copolymer (emulsifier): 6.2 g
2-ethylimidazole (accelerator): 4.5 g
p-toluenesulfohydrazide (blowing agent): 7.0 g The bisphenol A diglycidyl ether (BPAD) is heated to about 145° C. in a glass beaker which stands in an oil bath heated at 170° C. and is equipped with a high-speed stirrer. The cresol novolak glycidyl ether (CNG) is sprinkled into the BPAD in portions at this temperature, and as soon as the CNG has dissolved the cresol novolak is introduced in small portions. When everything has dissolved and the matrix has reached a temperature of about 145° C., the polyether-polymethylsiloxane copolymer is added with stirring. The glass beaker with the hot resin-curing agent mixture is removed from the oil bath and 2-ethyl-imidazole and p-toluenesulfohydrazide are stirred in homogeneously in the course of 20–30 seconds. The activated foam mixture is poured into the hot casting mould at 130°–140° C. in the course of a further 20 seconds. The casting mould is closed with screw clamps in the course of a further 20 seconds. The increase in pressure in the closed casting mould takes place after 1–5 minutes. After 10–20 minutes, the mould is opened and one plate of the still hot mould is removed. The cooled sheet of foam is split off into the desired test specimens with a circular saw. Exclusively test specimens without top coatings are tested. The properties of the foam obtained are shown in Table I.

EXAMPLE 2

Example 1 is repeated, but 11.8 g of p-toluenesulfohydrazide are now added to the resin-curing agent mixture. Curing conditions: 20 minutes/140° C. The properties of the foam obtained are shown in Table I.

EXAMPLE 3

A foam is produced as in Example 1 using the following compounds:
bisphenol A diglycidyl ether (liquid, epoxide equivalent weight 185): 166.1 g (0.9 equivalent)
cresol novolak glycidyl ether (solid, epoxide equivalent weight 230): 166.1 g (0.7 equivalent)
cresol novolak (solid, hydroxyl equivalent weight 115): 172.3 g (1.5 equivalents)
polyether-polymethylsiloxane copolymer: 3.6 g
2-ethylimidazole: 3.3 g
p-toluenesulfohydrazide: 10.0 g
Curing conditions: 20 minutes/145° C. The properties of the foam obtained are shown in Table I.

EXAMPLE 4

A foam is produced as in Example 1 using the following compounds:
bisphenol A diglycidyl ether (liquid, epoxide equivalent weight 185): 92.3 g (0.5 equivalent)
cresol novolak glycidyl ether (solid, epoxide equivalent weight 230): 92.3 g (0.4 equivalent)
cresol novolak (solid, hydroxyl equivalent weight 115): 95.7 g (0.8 equivalent)
polyether-polymethylsiloxane copolymer: 2.0 g
2-ethylimidazole: 1.8 g
p-toluenesulfohydrazide: 13.0 g
Curing conditions: 15 minutes/145° C. The properties of the foam obtained are shown in Table I.

EXAMPLE 5

Example 1 is repeated, but, instead of 287.2 g, 257.2 g (2.2 equivalents) of solid cresol novolak with a hydroxyl equivalent weight of 115 are now used. Curing conditions: 15 minutes/145° C. The properties of the foam obtained are shown in Table I.

EXAMPLE 6

A foam is produced as in Example 1 using the following compounds:
bisphenol A diglycidyl ether (liquid, epoxide equivalent weight 185): 276.8 g (1.5 equivalents)
cresol novolak glycidyl ether (solid, epoxide equivalent weight 230): 276.8 g (1.2 equivalents)
cresol novolak (solid, hydroxyl equivalent weight 115): 257.2 g (2.2 equivalents)
polyether-polymethylsiloxane copolymer: 6.2 g
2-ethylimidazole: 7.5 g
p-toluenesulfohydrazide: 7.0 g
nonylphenol: 30.0 g
Curing conditions: 15 minutes/135° C. The properties of the foam obtained are shown in Tables I and II.

EXAMPLE 7

Example 6 is repeated, but, instead of 30.0 g, 60.0 g of nonylphenol are now used. Curing conditions: 15 minutes/135° C. The properties of the foam obtained are shown in Table I.

EXAMPLE 8

Example 6 is repeated, but, instead of 30.0 g, 75 g of nonylphenol are now used. Curing conditions: 15 minutes/135° C. The properties of the foam obtained are shown in Table I.

EXAMPLE 9

A foam is produced as in Example 1 using the following compounds:
bisphenol A diglycidyl ether (liquid, epoxide equivalent weight 185): 221.5 g (1.2 equivalents)
cresol novolak glycidyl ether (solid, epoxide equivalent weight 230): 332.2 g (1.4 equivalents)
cresol novolak (solid, hydroxyl equivalent weight 115): 250.5 g (2.2 equivalents)
polyether-polymethylsiloxane copolymer: 6.0 g
2-ethylimidazole: 7.5 g
p-toluenesulfohydrzide: 6.8 g
nonylphenol: 30.0 g
Curing conditions: 15 minutes/135° C. The properties of the resulting foam are shown in Tables I and II.

EXAMPLE 10

A foam is produced as in Example 1 using the following compounds:
bisphenol A diglycidyl ether (liquid, epoxide equivalent weight 185): 166.1 g (0.9 equivalent)
cresol novolak glycidyl ether (solid, epoxide equivalent weight 230): 387.5 g (1.7 equivalents)
cresol novolak (solid, hydroxyl equivalent weight 115): 246.7 g (2.15 equivalents)
polyether-polymethylsiloxane copolymer: 6.0 g
2-ethylimidazole: 7.5 g
p-toluenesulfohydrazide: 6.8 g
nonylphenol: 30.0 g
Curing conditions: 15 minutes/140° C. The properties of the resulting foam are shown in Table I.

EXAMPLE 11

A foam is produced as in Example 1 using the following compounds:
bisphenol A diglycidyl ether (liquid, epoxide equivalent weight 185): 110.7 g (0.6 equivalent)
cresol novolak glycidyl ether (solid, epoxide equivalent weight 230): 442.9 g (1.9 equivalents)
cresol novolak (solid, hydroxyl equivalent weight 115): 240.1 g (2.1 equivalents)
polyether-polymethylsiloxane copolymer: 6.0 g
2-ethylimidazole: 7.5 g
p-toluenesulfohydrazide: 6.8 g
nonylphenol: 30.0 g
Curing conditions: 15 minutes/140° C. The properties of the resulting foam are shown in Table I.

EXAMPLE 12

Example 1 is repeated, but, instead of 4.5 g, 5.5 g of 2-ethylimidazole are now used. Curing conditions: 15 minutes/140° C. The properties of the foam obtained are shown in Table I.

EXAMPLE 13

Example 1 is repeated, but, instead of 4.5 g, 6.5 g of 2-ethylimidazole are now used. Curing conditions: 15 minutes/140° C. The properties of the foam obtained are shown in Table I.

TABLE I

Properties of the foams

| Foam according to Example | 1 | 2 | 3 | 4 | 5 | 6 | 7 | 8 | 9 | 10 | 11 | 12 | 13 |
|---|---|---|---|---|---|---|---|---|---|---|---|---|---|
| Density [g/cm$^3$] | 0.38 | 0.3 | 0.2 | 0.1 | 0.38 | 0.37 | 0.38 | 0.38 | 0.38 | 0.39 | 0.38 | 0.38 | 0.39 |
| Closed cellular structure* [%] | 86 | 93 | 93 | 92 | 86 | 92 | 92 | 92 | | | | 92 | 94 |
| Flexural strength acc. to DIN 53423 [N/mm$^2$] | 9.1 | 5.2 | 4.2 | 1.8 | 8.6 | 8.2 | 8.1 | 7.8 | | | | 9.1 | 8.1 |
| E modulus acc. to DIN 53423 at 23° C. [N/mm$^2$] | 275 | 171 | 111 | 35 | 282 | 308 | 322 | 342 | | | | 281 | 278 |
| Deflection acc. to DIN 53423 [mm] | 2.5 | 2.6 | 4.2 | 4.7 | 2.3 | 1.9 | 1.8 | 1.6 | | | | 2.6 | 2.3 |
| Compressive strength acc. to DIN 53421-A [N/mm$^2$] | 13.1 | 7.4 | 3.9 | 1.3 | 13.5 | 14.0 | 14.8 | 14.4 | 12.7 | 12.7 | 9.4 | 13.6 | 14.0 |
| Compression acc. to DIN 53421-A [%] | 11.4 | 2.2 | 1.8 | 1.1 | 11.9 | 11.5 | 11.5 | 10.0 | 17.3 | 16.4 | 14.6 | 12.7 | 12.0 |

*The closed cellular structure was measured with an "Air-Comparison Pycnometer", Beckmann model 930, and gives the true volume relative to the calculated volume in percent.

TABLE II

Properties of the foams at elevated temperature

| Foam according to Example | 6 | 9 |
|---|---|---|
| Compressive strength (DIN 53 421-A) at 23° C. [N/mm$^2$] | 12.7 | 12.6 |
| Compression (DIN 53 421-A) at 23° C. [%] | 16.6 | 17.4 |
| Compressive strength at 80° C. [N/mm$^2$] | 9.4 | 8.9 |
| Compression at 80° C. [%] | 14.8 | 11.4 |
| Compressive strength at 100° C. [N/mm$^2$] | 7.3 | 8.3 |
| Compression at 100° C. [%] | 14.8 | 12.8 |
| Compressive strength at 120° C. [N/mm$^2$] | 5.3 | 7.1 |
| Compression at 120° C. [%] | 14.7 | 15.2 |

EXAMPLE 14

The procedure of Example 1 is followed, but, instead of p-toluenesulfohydrazide, 7.6 g of azo-isobutyronitrile are now used, and, instead of polyether-polymethylsiloxane copolymer, 6.0 g of silicone oil (Rhodorsil ® 3139) are now employed. The foam matrix is poured at 105° C. into the mould heated to 140° C. Curing conditions: 15 minutes at 140° C. The cured foam has the following properties:
density = 0.36 g/cm$^3$
closed cellular structure = 94.0%

EXAMPLE 15

The procedure is as in Example 1, the following compounds being used for production of the foam:
bisphenol A diglycidyl ether (highly viscous, epoxide equivalent weight 222): 574.0 g (2.58 equivalents)
cresol novolak (solid, hydroxyl equivalent weight 115): 266.0 g (2.31 equivalents)
polyether-polymethylsiloxane copolymer 6.0 g
2-ethylimidazole 7.5 g
p-toluenesulfohydrazide 7.5 g
Curing conditions: 15 minutes at 140° C. The cured foam has a density of 0.39 g/cm$^3$.

What is claimed is:

1. A hot-foamable, thermosetting epoxy resin mixture containing (a) an epoxy resin or a mixture of epoxy resins with an average epoxide content of 4.4 to 5.0 equivalents/kg and an average epoxide functionality of more than 2.0, (b) a novolak with a hydroxyl equivalent weight of 90 to 120, 0.8 to 0.95 hydroxyl equivalents of component (b) being present in the epoxy resin mixture per 1 epoxide equivalent of component (a), (c) 0.1 to 1% by weight, based on the amount of components (a) and (b), of a curing accelerator, (d) 0.5 to 10% by weight, based on the amount of components (a) and (b), of a blowing agent which splits off nitrogen above 100° C. with decomposition, (e) 0.3 to 1% by weight, based on the total amount of the epoxy resin mixture, of an emulsifier, and if appropriate (f) foam modifiers.

2. An epoxy resin mixture according to claim 1, containing an epoxy resin or an epoxy resin mixture with an average epoxide content of 4.6 to 5.0 equivalents/kg, a novolak (b) with a hydroxyl equivalent weight of 115 to 120 and a curing accelerator (c) in amounts of 0.3 to 1% by weight, based on the amount of components (a) and (b).

3. An epoxy resin mixture according to claim 1, containing one or more aromatic glycidyl ethers as component (a).

4. An epoxy resin mixture according to claim 1, containing a cresol novolak glycidyl ether as component (a) or a mixture of a cresol novolak glycidyl ether and a bisphenol A diglycidyl ether.

5. An epoxy resin mixture according to claim 1, containing a cresol novolak as component (b).

6. An epoxy resin mixture according to claim 1, containing imidazole or an imidazole derivative as the curing accelerator (c).

7. An epoxy resin mixture according to claim 6, containing 2-ethylimidazole as the curing accelerator.

8. An epoxy resin mixture according to claim 1, containing p-toluenesulfohydrazide as the blowing agent (d).

9. An epoxy resin mixture according to claim 1, containing non-ionic substances as the emulsifier (e).

10. A process for the production of crosslinked, insoluble and nonfusible epoxy resin foams, which comprises foaming and curing an epoxy resin mixture according to claim 1 in the temperature range from 120° to 180° C.

11. A process according to claim 10, wherein said temperature is 130° to 160° C.

* * * * *